(12) United States Patent
Bigolin et al.

(10) Patent No.: US 11,518,462 B2
(45) Date of Patent: Dec. 6, 2022

(54) CONTROLLED DEFORMATION BICYCLE SADDLE

(71) Applicant: SELLE ITALIA S.R.L., Asolo (IT)

(72) Inventors: Riccardo Bigolin, Asolo (IT); Michele Cito, Asolo (IT)

(73) Assignee: SELLE ITALIA S.R.L., Asolo (IT)

( * ) Notice: Subject to any disclaimer, the term of this patent is extended or adjusted under 35 U.S.C. 154(b) by 0 days.

(21) Appl. No.: 17/085,642

(22) Filed: Oct. 30, 2020

(65) Prior Publication Data

US 2021/0129931 A1    May 6, 2021

(30) Foreign Application Priority Data

Oct. 31, 2019  (IT) ................. 102019000020184

(51) Int. Cl.
| | |
|---|---|
| *B62J 1/26* | (2006.01) |
| *B62J 1/00* | (2006.01) |
| *B62J 1/08* | (2006.01) |

(52) U.S. Cl.
CPC .............. *B62J 1/26* (2013.01); *B62J 1/002* (2013.01); *B62J 1/08* (2013.01)

(58) Field of Classification Search
CPC .............. B62J 1/26; B62J 1/002; B62J 1/08
See application file for complete search history.

(56) References Cited

U.S. PATENT DOCUMENTS

| | | | |
|---|---|---|---|
| 6,443,524 B1 * | 9/2002 | Yu ............................. | B62J 1/02 297/195.1 |
| 6,450,572 B1 | 9/2002 | Kuipers | |
| 6,773,061 B1 * | 8/2004 | Shu ............................ | B62J 1/00 297/195.1 |
| 7,735,916 B2 * | 6/2010 | Yu ............................. | B62J 1/20 297/215.16 |
| 8,944,502 B2 * | 2/2015 | Winefordner .............. | B62J 1/00 297/202 |
| 9,446,808 B2 * | 9/2016 | Marui ........................ | B62J 1/02 |
| 9,764,788 B1 * | 9/2017 | Sung ........................ | F16F 1/128 |
| 10,435,098 B2 * | 10/2019 | Bigolin ..................... | B62J 1/00 |
| 10,479,430 B2 * | 11/2019 | Yu ............................. | B62J 1/007 |

(Continued)

FOREIGN PATENT DOCUMENTS

| | | |
|---|---|---|
| CN | 101638117 B | 9/2013 |
| EP | 1531118 A2 | 5/2005 |

OTHER PUBLICATIONS

International Search Report issued in corresponding International Application No. IT201900020184 dated Jun. 12, 2020.

*Primary Examiner* — Philip F Gabler
(74) *Attorney, Agent, or Firm* — ArentFox Schiff LLP; Michael Fainberg

(57) ABSTRACT

A bicycle saddle includes a shell fitted with fastening means for fastening the bicycle saddle to an associable bicycle, the shell extending, in a prevailing longitudinal direction (Y-Y), from a front end to a rear end, and a padding associated to an upper portion of the shell, opposite a frame of the associable bicycle. The shell has a rigid portion supporting the fastening means and a controlled deformation portion positioned between the rigid portion and the padding. The controlled deformation portion has at least one yielding insert adapted to deform elastically under compression during use.

13 Claims, 4 Drawing Sheets

(56) References Cited

U.S. PATENT DOCUMENTS

2007/0001336 A1\* 1/2007 Nishibori ............... D04H 3/037
264/103
2007/0273184 A1\* 11/2007 Garneau ................... B62J 1/00
297/195.1

\* cited by examiner

CONTROLLED DEFORMATION BICYCLE SADDLE

CROSS REFERENCE TO RELATED APPLICATION

This application claims priority to Italian Patent Application No. 102019000020184 filed on Oct. 31, 2019, the entire contents of which is hereby incorporated in its entirety by reference.

FIELD OF THE INVENTION

The present invention relates to a controlled deformation bicycle saddle. It should be noted that the present invention relates to the field of bicycles generally driven both by humans (typically by pedal, but also by arm) and by an engine, be it electric, endothermic and/or hybrid solutions. Therefore, cycles such as bicycles, pedelec bicycles, but also motorcycles and mopeds in general are included.

BACKGROUND OF THE INVENTION

As is known, bicycle saddles aim at making sitting comfortable for the user.

The fewer suspensions the vehicle has (such as in the case of many bicycles) and the longer and more continuously the vehicle is used by the user, the more important comfort is.

The above problem is partially solved in the field of motorcycles, since vehicles are usually provided with suspension systems (both front axle and rear axle) which, in fact, considerably improve comfort of the seat.

In the case of bicycles, use of suspensions is confined only to certain specific types of bicycle and, in any event, the saddle has very small dimensions which amplify the problem of comfort, given that the user has a smaller support surface on which to unload his/her weight. Another complication is due to the user needing to pedal; therefore, the saddle cannot be too wide in order not to hinder the correct pedaling movement.

SUMMARY OF THE INVENTION

Therefore, a need is felt to solve the drawbacks and limitations mentioned above with reference to the prior art.

Said need is met by a bicycle saddle as described and claimed herein.

BRIEF DESCRIPTION OF THE DRAWINGS

Further features and advantages of the present invention will become more comprehensible from the following description of preferred embodiments thereof given by way of non-limiting examples, in which.

Elements or parts in common to the embodiments described will be indicated hereinafter using the same reference numerals.

DETAILED DESCRIPTION

Figure 3:
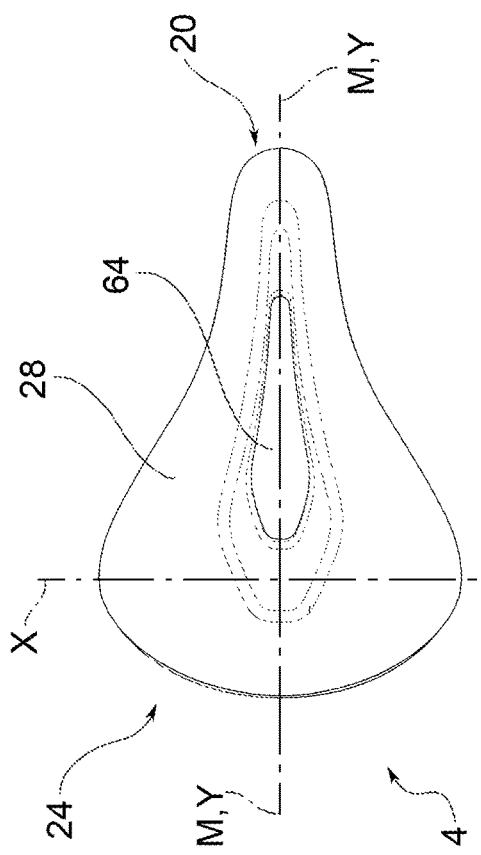
FIG. 3 shows a top plan view of the saddle in FIGS. 1-2.
Figure 4:
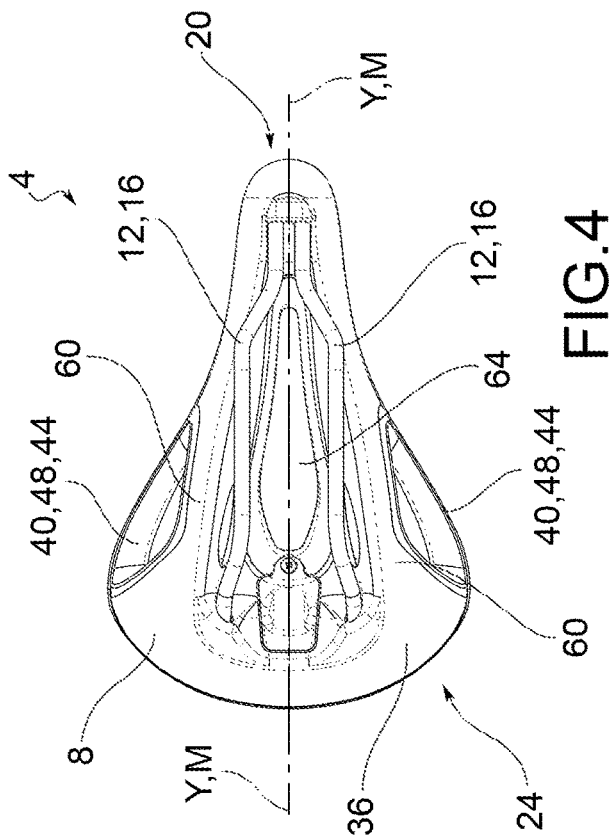
FIG. 4 shows a bottom plan view of the saddle in FIGS. 1-2.
Figure 1:
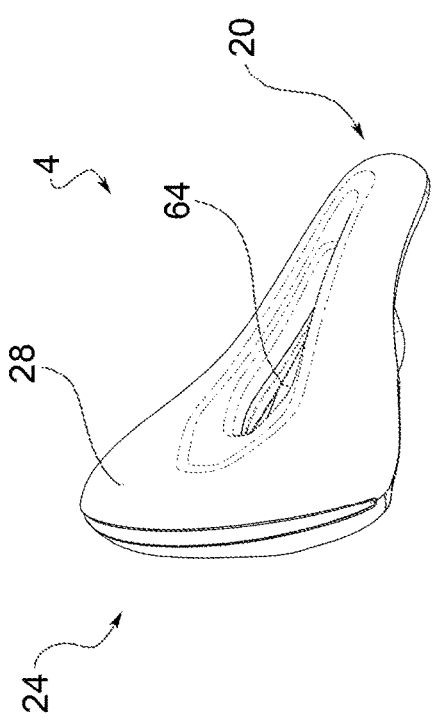
FIGS. 1-2 show perspective views, from different angles, of a bicycle saddle according to an embodiment of the present invention.
Figure 2:
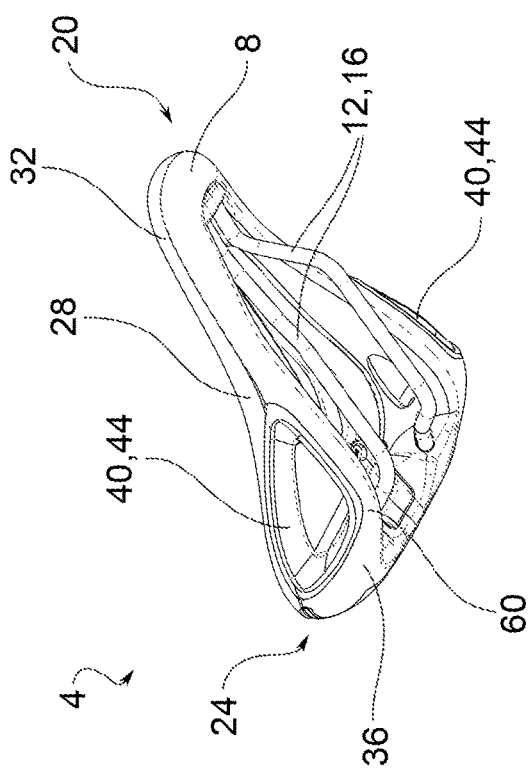
Figure 5:
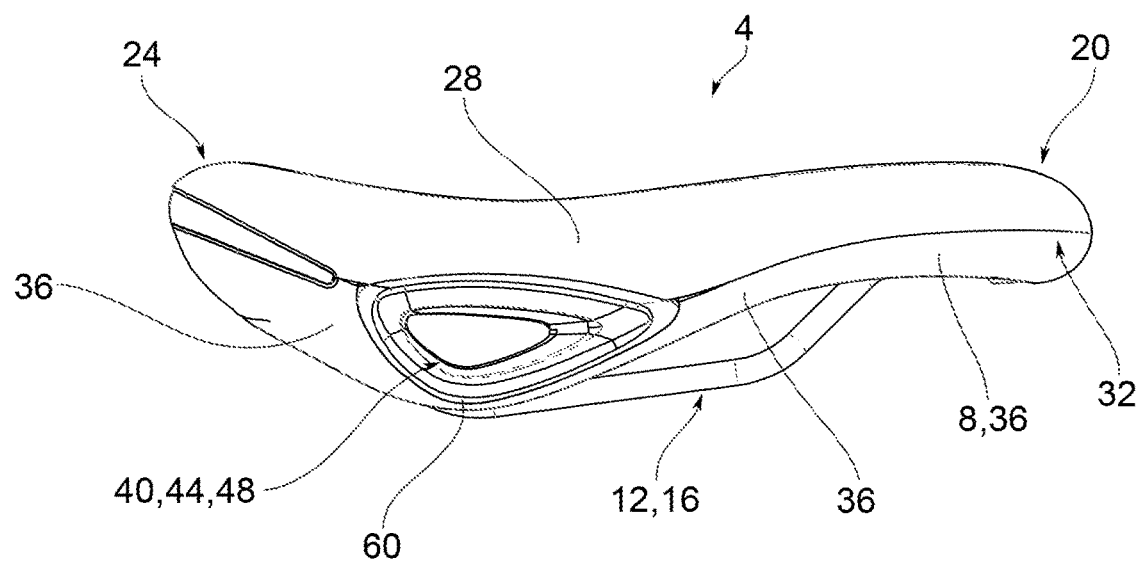
FIG. 5 shows a side view of the saddle in FIGS. 1-2.
Figure 6:
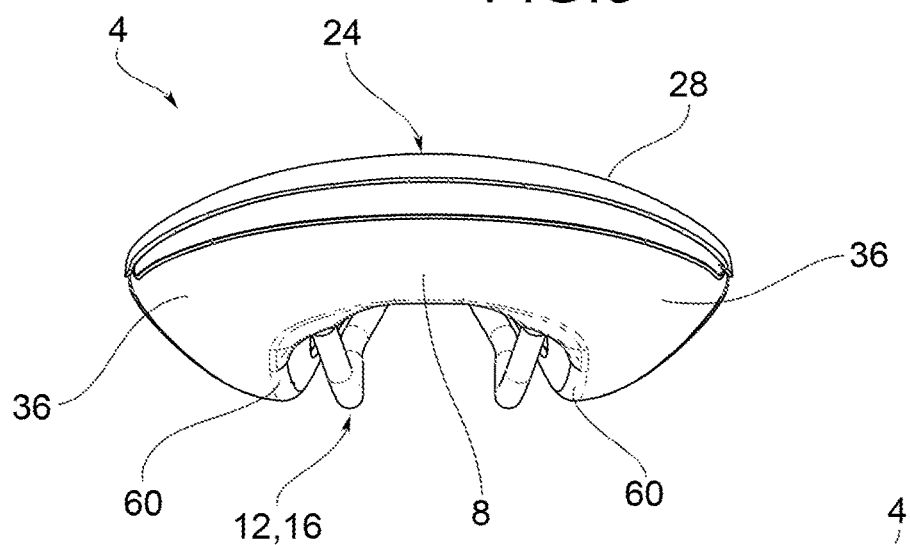
FIG. 6 shows a rear view of the saddle in FIGS. 1-2.
Figure 7:
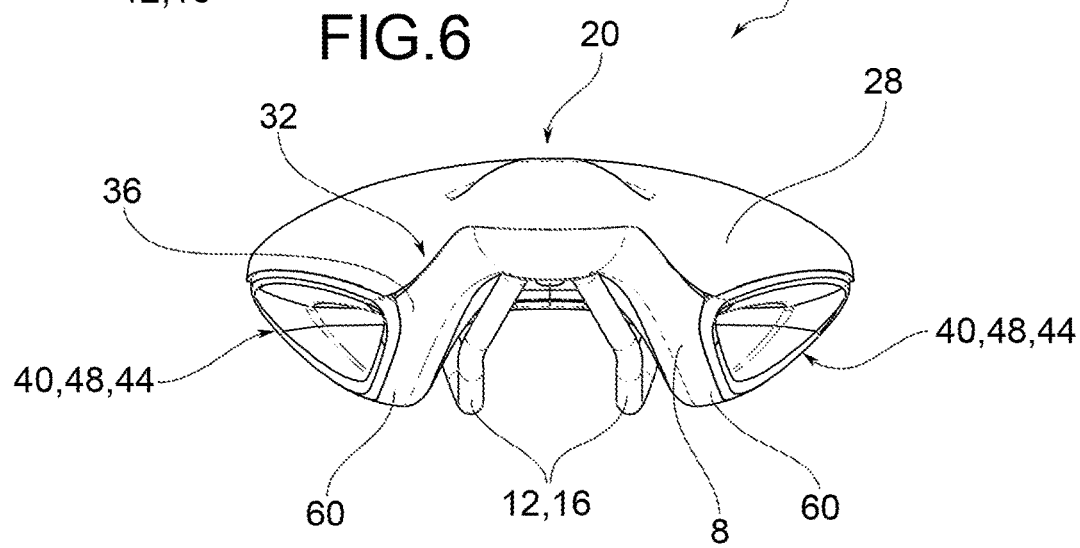
FIG. 7 shows a front view of the saddle in FIGS. 1-2.
Figure 8:
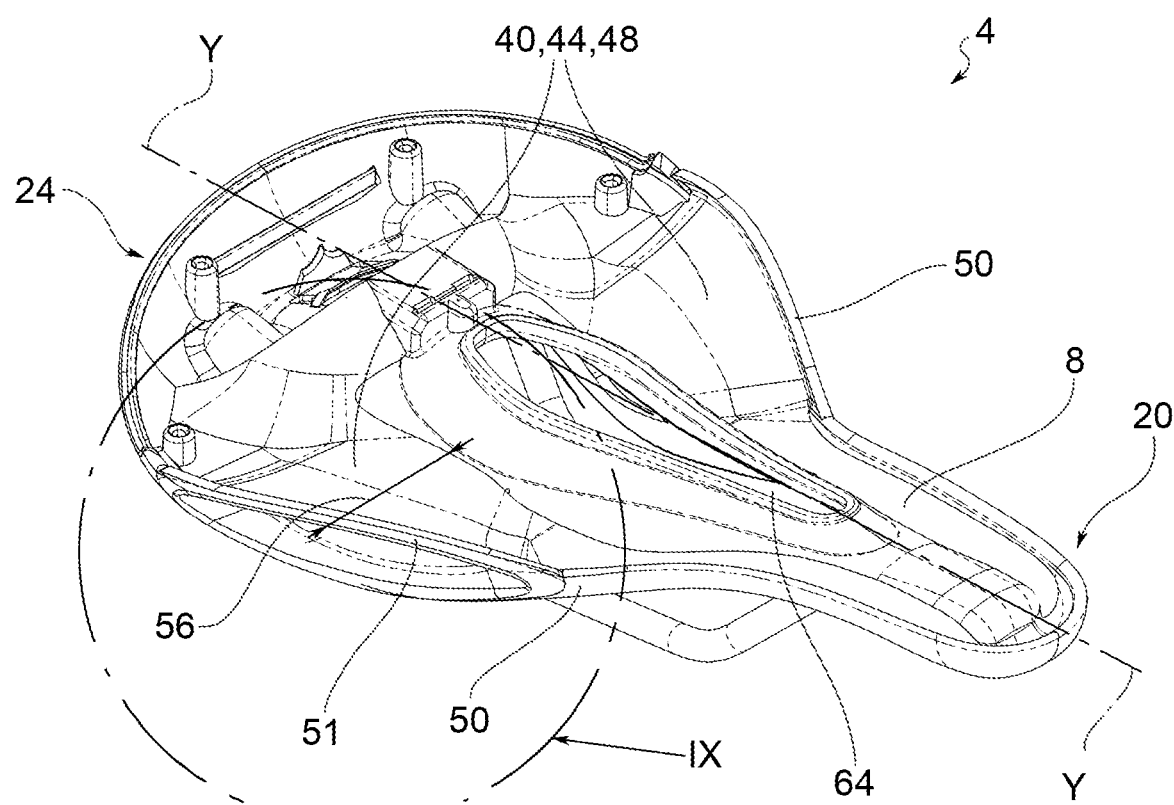
FIG. 8 shows a perspective view, in separate parts, of a saddle according to the present invention.
Figure 9:
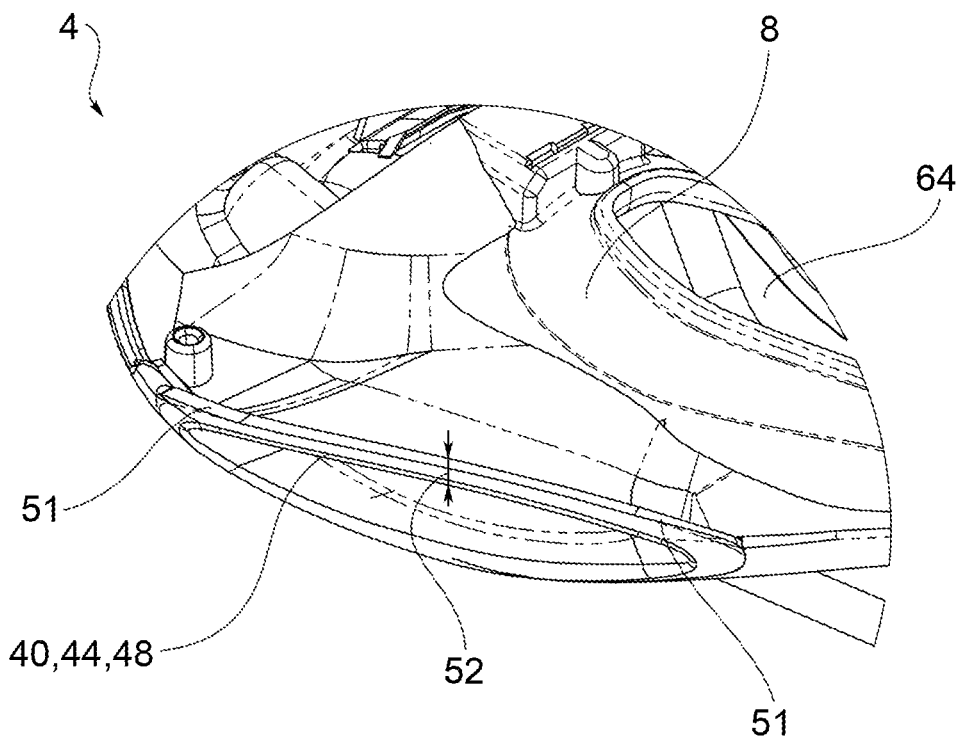
FIG. 9 shows the enlarged detail IX in FIG. 8.
Figure 10:
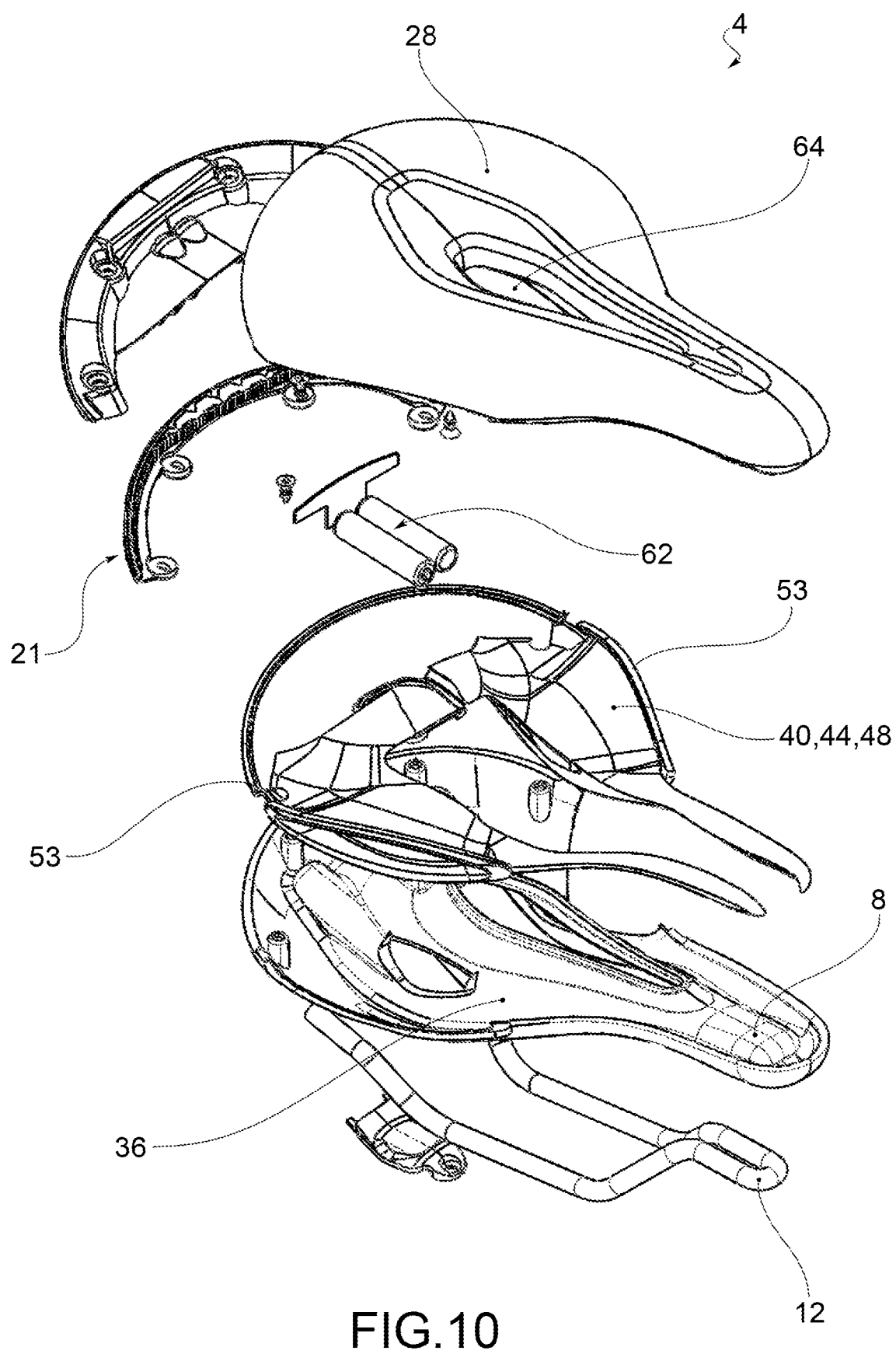
FIG. 10 shows a perspective view, in separate parts, of a further saddle according to an embodiment of the present invention.

With reference to the drawings, a bicycle saddle is indicated by numeral 4 as a whole. As mentioned above, the present invention relates to the field of bicycles generally driven both by humans (typically by pedal, but also by arm) and an engine, be it electric, endothermic and/or hybrid solutions. Therefore, cycles such as bicycles, pedelec bicycles, but also motorcycles and mopeds in general, are included regardless of the type of traction power.

The bicycle saddle 4 comprises a shell 8 fitted with fastening means 12 for fastening the bicycle saddle 4 to an associable bicycle.

The fastening means 12 may comprise, for example in a known manner, a tube engaged in a corresponding hub fastened to the bicycle frame, but also tracks 16 (commonly called "rails") adapted to be coupled to and gripped between specific plates fastened to the frame of the associable bicycle.

The shell 8 extends, in a prevailing longitudinal direction Y-Y, from a front end 20 to a rear end 24.

In a known manner, when in use, the front end 20 is directed in the forward movement direction of the associable bicycle, vice versa the rear end 24.

The shell 8 also has an overall triangular shape tending to widen, in a known manner, from the front end 20 towards the rear end 24, as clearly shown in the plan views 3-4.

Overall, in known manner, the shell 8 and the saddle 4 have a longitudinal centerline plane M-M parallel to said prevailing longitudinal direction Y-Y. Preferably, said longitudinal centerline plane also is a symmetry plane for said saddle.

The saddle 4 further comprises a padding 28 associated to an upper portion 32 of the shell 8, opposite said frame of the associable bicycle. The padding 28 is shaped to form a comfortable rest for the user's buttocks.

Said padding may be made of polyurethane coated with a PVC and/or PU coating.

The shell 8 advantageously comprises a rigid portion supporting said fastening means 12 and a controlled deformation portion 40 positioned between the rigid portion 36 and the padding 28.

According to a possible embodiment, said rigid portion 36 of the shell 8 is made in polypropylene with a Young's modulus ranging from 1200 to 3000 MPa.

According to a possible embodiment, said controlled deformation portion 40 comprises at least one yielding insert 44 adapted to deform elastically under compression during use. In other words, the yielding insert 44, as better described hereinafter, is shaped to deform due to compression under the load transmitted by the user's ischium.

The saddle 4 preferably comprises a pair of controlled deformation portions 40, each provided with at least one yielding element 44 adapted to deform elastically under compression, said controlled deformation portions 40 being arranged symmetrically on opposite sides of the longitudinal centerline plane M-M of the saddle 4.

The controlled deformation portion 40 is positioned on the side of the rear end 24, at the user's ischium in the configuration of use of saddle 4.

The yielding insert 44 may have various configurations.

According to a possible embodiment, the yielding insert 44 comprises a perimetral structure closed in a loop 48, which preferably, but not necessarily, is internally hollow.

For example, said perimetral structure closed in a loop 48 has a wall thickness 52 ranging from 2 mm to 4 mm.

For example, with respect to a cross-section plane parallel to the longitudinal centerline plane M-M of the saddle 4, the perimetral structure closed in a loop 48 has a triangular cross-section, with sides of 20 mm to 50 mm; such geometrical configuration allows obtaining a controlled deformation of the controlled deformation portion 40 ranging from 1.5 to 4 mm (during pedaling).

Moreover, the perimetral structure closed in a loop preferably extends along a transverse direction X-X perpendicular to the longitudinal centerline plane M-M of the saddle 4, for a dimension of 20 mm to 80 mm; such geometrical configuration allows obtaining a controlled deformation of the controlled deformation portion 40 ranging from 1.5 to 4 mm (during pedaling).

According to an embodiment, said perimetral structure closed in a loop 48 has a pair of ribs 51 at an outer perimetral profile 50 of the shell 8, which identify an interspace 53. Said ribs 51 obtain a stiffening of the yielding insert at a critical portion, i.e. more yielding portion, on one side because it is perimetral and therefore more cantilevered with respect to the rigid portion 36. Said ribs 51 identify an interspace 53 adapted to at least partially house part of the overmoulded padding on the other side, thereby improving cohesion between the padding 28 and the shell 8.

Said perimetral structure closed in a loop 48 is preferably overmoulded with respect to the rigid portion 36 for a stretch 56 having a minimum extension of 3 mm with respect to a transverse direction X-X perpendicular to the longitudinal centerline plane M-M of the saddle.

According to a possible embodiment, said yielding insert 44 comprises at least one filler element which at least partially obstructs said perimetral structure closed in a loop 48.

The yielding insert is preferably, but not necessarily, made of SBS thermoplastic material.

Said yielding insert 44 preferably comprises SBS thermoplastic material having a hardness ranging from 30 to 80 shore A.

According to a preferred embodiment, the yielding inserts 44 adapted to deform elastically under compression are placed at concave areas 60 of the rigid portion 36 of shell 8, arranged on the side of the rear end 24 of the saddle 4, on opposite and symmetrical sides with respect to the longitudinal centerline plane M-M of said saddle 4.

Thereby, the yielding inserts 44 have a sufficient volume to facilitate the respective controlled elastic deformation and ensure the correct comfort during the pedaling.

The saddle may optionally be provided with certain accessories at the rear end 24, such as, for example, an electronic hub for feeding signalling lights, a backup camera, proximity sensors and similar devices. Such devices may advantageously be housed inside the shell. Such devices may also be at least partially arranged on the side of the front end 20 of the saddle 4.

The method for making a bicycle saddle according to the present invention is now described.

In particular, manufacturing the saddle 4 preferably comprises the steps of co-moulding in sequence both the shell 8 made of thermoplastic material and the controlled deformation portion 40.

The moulding of the shell 8 preferably directly occurs on the fastening means 12 or rails 16 so as to directly incorporate them into said shell.

The padding 28 may be made of PU by means of "vacuum" technology so as to comprise the actual polyurethane padding and an upper coating covering, preferably made of PVC or PU.

Operation of a bicycle saddle according to the present invention is now described.

As previously described, the shell 8 forms a bearing element for supporting and fastening the saddle to the frame of the associable bicycle.

With respect to saddle 4, the shell 8 is substantially non-deformable in the conditions of use thereof, with the exception of the controlled deformation portions 40.

The padding 28, which overlaps the shell, has the function of damping the sitting in a known manner.

The controlled deformation portions 40 are the innovative element because they control the deformation of saddle 4 so as to allow an increased comfort for the user, at the critical areas, i.e. the resting areas of the ischium. The deformation substantially consists of a downwards bending of the controlled deformation portions and of the yielding inserts; such bending results in a lowering or downwards translation of the padding 28. Said deformation is elastic since, when the compression action ceases, the controlled deformation portions return to the non-deformed configuration thereof.

Indeed, the padding has a different deformation at the controlled deformation portions 40 with respect to the other areas, which instead are supported and carried by rigid portions of the shell 8.

The controlled deformation is of elastic type and is obtained by compression and controlled deformation of the yielding inserts which are able to best adapt to the critical areas, i.e. the ischium.

The deformation is controlled also by the concave areas 60 of the rigid portion 36 provided at said controlled deformation portions 40, said concave areas 60 allowing an increased control of the deformation of the controlled deformation portions 40.

The saddle may also be provided in a known manner with a prostatic decompression area 64, i.e. a depression or also a through hole which propagates in a known manner from the padding 28 towards the underlying shell 8. Said decompression area 64 is conventionally positioned symmetrically straddling said longitudinal centerline plane M-M.

Electronic devices, when provided, may perform various functions including luminous signaling of the vehicle (for example, position lights of the vehicles by LED devices 21), signaling of a turn (such as vehicle direction indicators), but also the possibility of housing a backup camera which can allow recording.

It is also possible to provide using proximity sensors and similar devices to inform the user of nearing of obstacles and/or other vehicles, which could be potential hazards for the safety of the bicycle driver.

As shown, such devices may advantageously be housed inside the shell. Any feeding devices, such as batteries 62, may also be housed inside the saddle shell. Alternatively, electric connecting means of such devices to a supply source such as for example, a battery of a bicycle provided with electric motors and relative power supply devices, may be housed.

As can be appreciated from the description above, the bicycle saddle allows to overcome the drawbacks of the prior art.

In particular, the present invention allows increased pedaling to be obtained by virtue of the controlled deformation portions yielding, in a controlled manner, at the more critical areas for the comfort of the saddle, i.e. the ischium compression areas.

Therefore, the saddle has an alternation of relative rigid areas and areas with controlled elastic yielding.

The elastic deformation of said controlled deformation portions is variable over time during pedaling by virtue of the elastic deformation of said portions and of the compression of the yielding inserts (in turn facilitated by the corresponding concave areas of the shell).

The specific combinations of materials, shapes and dimensions of the inserts allow obtaining an adequate support of the saddle and an exact yielding at the areas of greatest stress (corresponding to the ischium). Therefore, the saddle is capable of simultaneously transmitting correct rigidity, without compromising the pedaling performance, and optimal pedaling comfort, by elastically and limitedly yielding in the most stressed portions.

In order to meet contingent and specific needs, those skilled in the art may make several changes and variants to the saddles described above without departing from the scope of protection as described and claimed herein.

What is claimed is:

1. A bicycle saddle comprising:
   a shell fitted with fastening means for fastening the bicycle saddle to an associable bicycle, the shell extending, in a longitudinal direction (Y-Y), from a front end to a rear end, the longitudinal direction (Y-Y) being a prevailing direction,
   a padding associated to an upper portion of the shell, opposite a frame of the associable bicycle,
   wherein the shell comprises a rigid portion supporting said fastening means and a controlled deformation portion positioned between the rigid portion and the padding, and
   wherein the controlled deformation portion comprises at least one yielding insert suitable to deform elastically under compression during use, wherein said at least one yielding insert comprises a structure closed in a loop, wherein said structure closed in the loop has a triangular cross-section.

2. The bicycle saddle of claim 1, wherein said structure closed in the loop is located at a perimeter of the at least one yielding insert.

3. The bicycle saddle of claim 1, wherein said structure closed in the loop is internally hollow.

4. The bicycle saddle of claim 1, wherein said structure closed in the loop has a wall thickness ranging from 2 mm to 4 mm.

5. The bicycle saddle of claim 1, wherein said structure closed in the loop, at an outer profile of the shell, comprises a pair of ribs identifying an interspace.

6. The bicycle saddle of claim 1, wherein said structure is closed in the loop with respect to a cross-section plane parallel to a longitudinal centerline plane (M-M) of the bicycle saddle and having the triangular cross-section with sides of from 20 mm to 50 mm.

7. The bicycle saddle of claim 1, wherein said structure closed in the loop, extends in a transverse direction (X-X), perpendicular to a longitudinal centerline plane (M-M) of the bicycle saddle, by a dimension ranging from 20 mm to 80 mm.

8. A bicycle saddle comprising:
   a shell fitted with fastening means for fastening the bicycle saddle to an associable bicycle, the shell extending, in a longitudinal direction (Y-Y), from a front end to a rear end, the longitudinal direction (Y-Y) being a prevailing direction,
   a padding associated to an upper portion of the shell, opposite a frame of the associable bicycle,
   wherein the shell comprises a rigid portion supporting said fastening means and a controlled deformation portion positioned between the rigid portion and the padding,
   wherein the controlled deformation portion comprises at least one yielding insert suitable to deform elastically under compression during use, wherein said at least one yielding insert comprises a structure closed in a loop, and
   wherein said structure closed in the loop is overmoulded with respect to the rigid portion of the shell for a stretch having a minimum extension of 3 mm with respect to a transverse direction (X-X), perpendicular to a longitudinal centerline plane (M-M) of the bicycle saddle.

9. The bicycle saddle of claim 1, wherein the bicycle saddle comprises a pair of controlled deformation portions, each controlled deformation portion comprising at least one yielding insert suitable to deform elastically under compression, said pair of controlled deformation portions being arranged symmetrically on opposite sides of a longitudinal centerline plane (M-M) of the bicycle saddle.

10. The bicycle saddle of claim 1, wherein said at least one yielding insert comprises at least one filler element at least partially obstructing said structure closed in the loop.

11. The bicycle saddle of claim 1, wherein said at least one yielding insert is made of SBS thermoplastic material having hardness ranging from 30 to 80 shore A.

12. The bicycle saddle of claim 1, wherein said rigid portion of the shell is made in polypropylene with a Young's modulus ranging from 1200 to 3000 MPa.

13. The bicycle saddle of claim 1, wherein said padding is made of polyurethane coated with a PVC and/or PU coating.

* * * * *